United States Patent [19]

Hudson et al.

[11] 4,180,822
[45] Dec. 25, 1979

[54] OPTICAL SCANNER AND RECORDER

[75] Inventors: Kenneth C. Hudson, Philadelphia, Pa.; Donald G. Herzog, Collingswood, N.J.

[73] Assignee: RCA Corporation, New York, N.Y.

[21] Appl. No.: 896,034

[22] Filed: Apr. 13, 1978

[51] Int. Cl.² ............................................. G01D 15/14
[52] U.S. Cl. .................................. 346/108; 350/6.8; 358/293
[58] Field of Search ............ 346/108, 76 L; 358/293, 358/295; 354/5, 4; 350/6.8; 250/578

[56] References Cited

U.S. PATENT DOCUMENTS

| 3,144,637 | 8/1964 | Adams | 346/108 X |
| 3,727,062 | 4/1973 | Foster | 346/108 X |
| 3,809,806 | 5/1974 | Walker | 346/108 X |

*Primary Examiner*—Joseph W. Hartary
*Attorney, Agent, or Firm*—Samuel Cohen; Carl V. Olson

[57] ABSTRACT

A flat field laser recorder includes means to direct a beam from a laser through an acousto-optic light modulator, an acousto-optic light deflector/modulator, and a beam scanner, to scan-lines on a linearly-moving light-sensitive film. The acousto-optic light modulator is operated by electrical oscillations which are amplitude modulated by a video information signal. The acousto-optic light deflector/modulator is operated by electrical oscillations which are amplitude modulated to provide an automatic brightness control of the beam, and are frequency modulated to provide an automatic scan-line spacing control. In addition, a plurality of simultaneous oscillation frequencies are selectively applied to the deflector/modulator to provide beam spot elongation control in the direction perpendicular to the scan-lines.

7 Claims, 5 Drawing Figures

OPTICAL SCANNER AND RECORDER

This invention relates to optical recorders and optical readers including optical scanners of the type in which a light beam is scanned across a line on a relatively moving medium. The medium may be photosensitive film in the case of a recorder, or may be a medium containing recorded indicia in the case of a reader.

According to an example of the invention, a light beam is deflected to scan a line on a moving recording medium or recorded medium. An acousto-optic light deflector/modulator positioned in the path of the light beam is supplied with oscillations from an oscillator. The amplitude of the oscillations is varied under control of a signal from a photoelectric cell to effect an automatic brightness control of the beam, and the frequency of the oscillations is varied under control of a signal from a circuit including an array of photocells to effect an automatic line scan spacing control of the beam.

Figure 1:
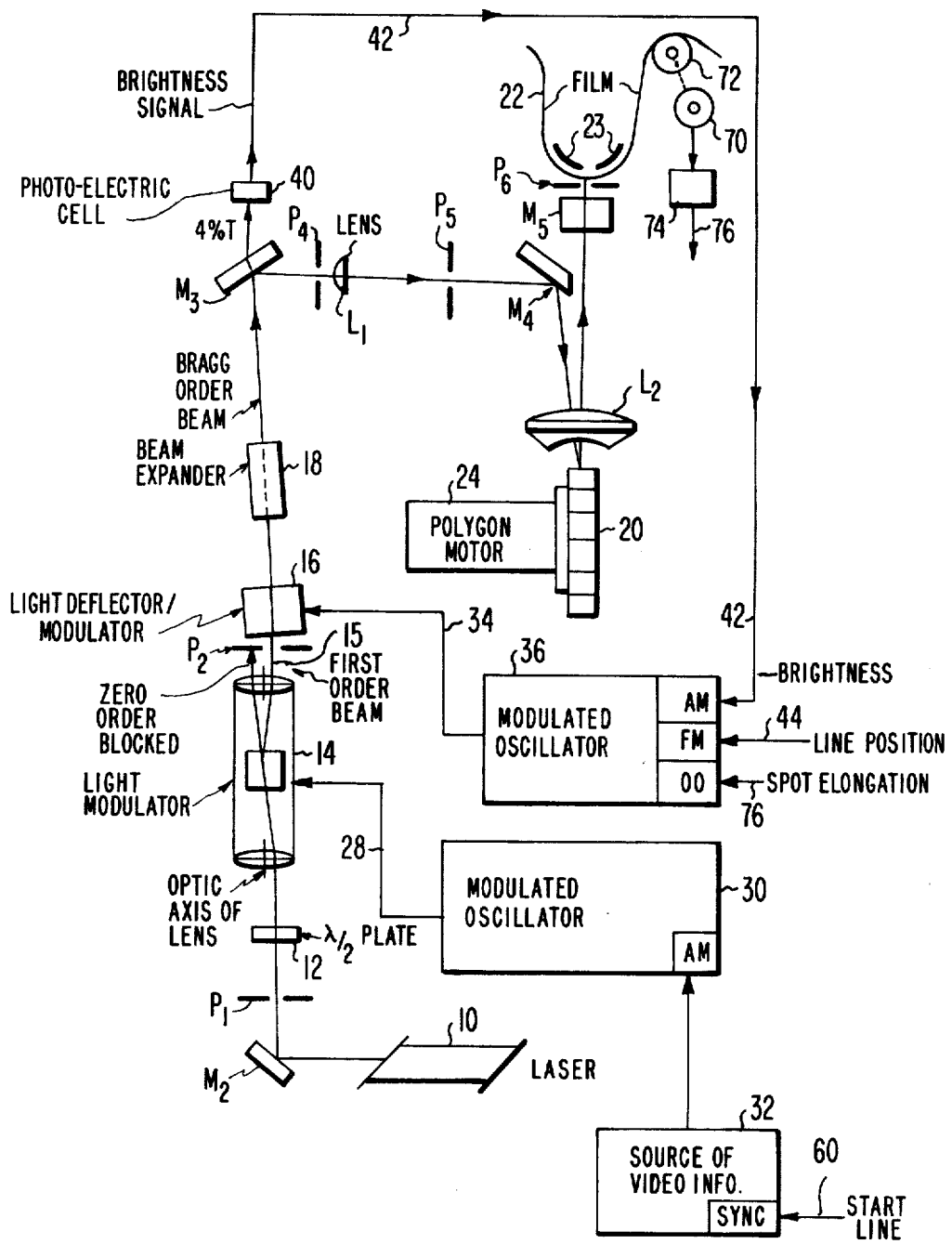
FIG. 1 is a diagram of an optical recording system constructed according to the teachings of the invention.

Reference is now made to FIG. 1 for a description of the optical recording system. A light beam from a laser 10 is directed to a recording film over a path including, in the order listed, a beam-folding mirror $M_2$, a pin hole aperture plate $P_1$, a quarter wave plate 12 for rotating the polarization of the light beam, an acousto-optic light modulator 14, a knife edge light stop $P_2$ which blocks the zero order light beam and passes the first order defracted beam along path 15, an acousto-optic light deflector/modulator 16, a beam expander 18, a 96 percent reflecting mirror $M_3$, a pin hole aperture plate $P_4$, a lens $L_1$, a pin hole aperture plate $P_5$, a mirror $M_4$, a flat field scan lens $L_2$, a multi-faceted mirror 20 from which the beam returns through the lens $L_2$ and scans a line 26 on a linearly moving film or recording medium 22 which is guided by a film guide 23. The film guide 23 may be as described in patent application Ser. No. 832,284 filed on Sept. 12, 1977, by S. L. Corsover on a "Film Guide For Optical Scanners" and assigned to the assignee of this present application.

The laser 10 may be a 25 milliwatt helium-neon gas laser such as manufactured by Spectra Physics Company. The light modulator 14 may be a Model MHN50 "Modulateur Acousto-Optique" modulator manufactured by Soro Electro Optics Company of France and sold by J-Y Optical Company, Metuchen, N.J. The described acousto-optic modulator includes a modulated oscillator 30 operating at a fixed frequency of 100 MHz which supplies its output over line 28 to the light modulator 14. The amplitude of the 100 MHz oscillation is controlled by a source 32 of video information which supplies an electrical signal to the amplitude modulation input AM of the oscillator 30. The amplitude of the oscillations from the oscillator are thereby varied in accordance with the video information, and this causes the amplitude of the light beam 15 which emerges from the light modulator 14 to be correspondingly amplitude modulated. The light beam which is thus modulated in amplitude is subsequently made to scan the moving film 22 in line-by-line fashion to record a graphic image in a manner somewhat similar to the manner in which a picture is created on the face of a television picture tube.

The light deflector/modulator 16 may be a Model ADM-40 Acousto-Optic Deflector Modulator mady by IntraAction Corporation of Bensenville, IL., 60106. This apparatus includes a Model DE-40 VCO (voltage-controlled oscillator) Deflector Drive unit for use as the modulated oscillator 36 in FIG. 1. The modulated oscillator 36 produces an output oscillation at a frequency of 40 MHz, for example, applied over line 34 to operate the light deflector/modulator 16. The oscillations from oscillator 36 are amplitude modulated by an electrical signal derived from a photoelectric cell 40 which receives 4 percent of the light beam impinging on the mirror $M_3$. The electrical signal from the photo-electric cell 40 is passed over line 42 to the amplitude modulation input AM of the modulated oscillator 36. The electrical signal, representing the brightness of the beam which is directed to the film, controls the amplitude of the oscillations produced by oscillator 36 and in this way operates as an automatic brightness control to maintain the average brightness of the beam at a desired constant average value. The automatic brightness controlled oscillations from oscillator 36 control the amount of light energy in the first order beam passed from the deflector/modulator 16 by diffracting light energy from the zero order beam. The diffracted first order beam is passed by the pin hole aperture plate $P_2$ to the beam expander lens $L_1$.

The 40 MHz oscillation from oscillator 36 is frequency modulated by a line position electrical signal applied over line 44 to the frequency modulation input FM of the oscillator 36. The electrical signal causes the frequency of the oscillation to be varied in a manner to provide a varying deflection of the light beam emerging from the deflector/modulator 16. The light beam is deflected in such a way as to make the spacing of successive recorded lines on the film to be uniform despite inaccuracies that may exist in the precise orientation of the various facets on the multi-faceted mirror 20 driven by the motor 24.

Figure 2:
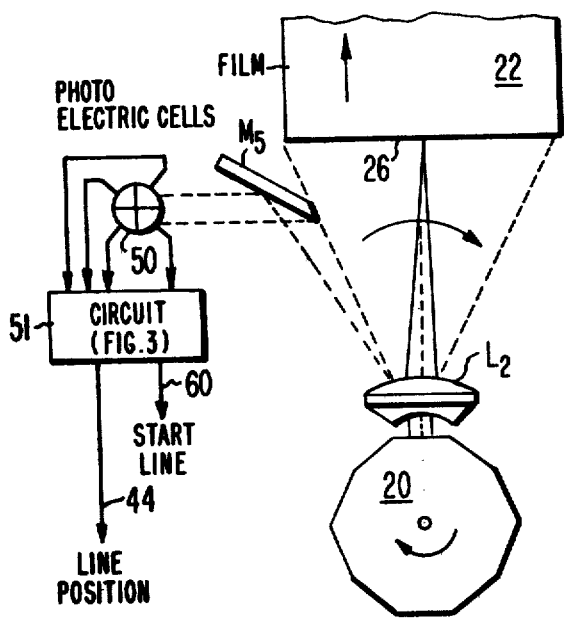
FIG. 2 is a diagram of a side view of the system of FIG. 1.

The source of the line position signal applied at 44 to the frequency modulation input of oscillator 36 will be described by references to FIGS. 2 and 3, where FIG. 2 is a side view of the video scanner showing the line 26 on the moving film which is scanned by the light beam passing from left to right. Each scan-line results from the reflection of light by a separate respective one of the facets of the mirror 20. Before each sweep of the beam across a scan-line on film 22, the beam is reflected by a mirror $M_5$ and caused to pass over an array of photoelectric cells including four individual cells arranged in four respective quadrants. An electrical signal derived from each of the four cells is applied to an electrical circuit 51 which is shown in greater detail in FIG. 3.

Figure 3:
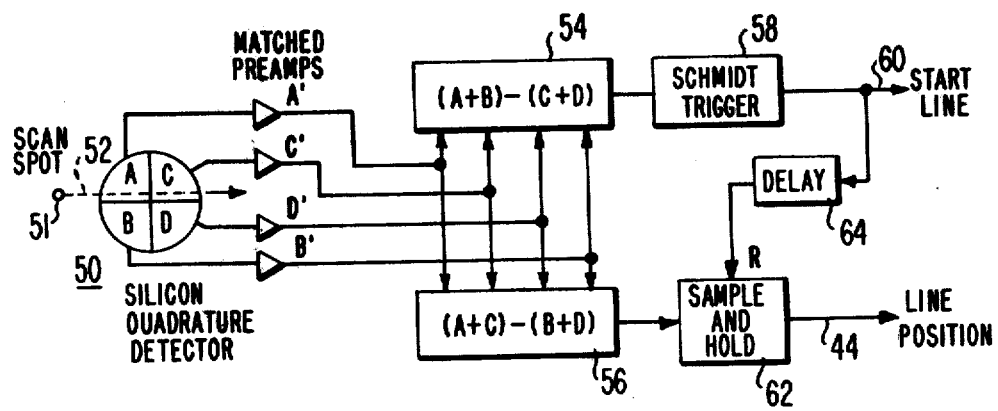
FIG. 3 is a diagram of a circuit useful in the system of FIGS. 1 and 2.

In FIG. 3 the quadrature photo-electric cells are labeled A, B, C and D. The path taken by the scanning beam of light is illustrated as starting, for example, from a spot 51 and proceeding across the photo-electric cells A and C prior to tracing a line 26 on the film 22. The electrical outputs from the four photo-cells A through D are applied through respective amplifiers A' through D' to arithmetic units 54 and 56. If the beam follows the path 52, electrical signals generated by photo-cells A and C produce an electrical signal from the arithmetic unit 54 which changes polarity when the beam crosses the boundary between photo-cells A and C. This transition is applied to a pulse generator 58 which may be in the form of a Schmidt trigger and which produces a synchronizing pulse at 60 which indicates a reference time just preceding the beginning of an optical scan-line on film 22. If the scan spot follows a parallel path passing over photo-cell B and photo-cell D, a similar electrical transition at the same time is created which results in a similar start-of-scan-line synchronizing pulse at 60. In all cases, the synchronizing pulse at 60 is applied to the synchronizing input SYNC of the source 32 of video information in FIG. 1.

The quadrature photo-cells 50 are also arranged to provide information on the position of the line scan relative to a reference position and to generate a correction signal to correct the position of the line scan over the film so that all the successive scan lines on the film are equally spaced in the direction of movement of the film. If the recording light beam follows the path 52 shown in FIG. 3, the scan-line is upwardly displaced from a reference position, so that large electrical signals are produced by photo-cells A and C, and zero amplitude or very small amplitude signals are produced by photo-cells B and D. These analog electrical signals are applied to the arithmetic unit 56 and as a result of the analog arithmetic equation shown in the drawing, the unit 56 produces an output which indicates that the scan-line 52 is upwardly offset from the desirable position which is represented by the line dividing A and C from B and D. The output from analog arithmetic unit 56 is thus a signal indicating both the direction in which the scan-line departs from the desired path and also the magnitude of the departure of the scan-line from the desired path. If, for example, the scanline follows a path through photo-cells B and D, the polarity of the electrical signal from the arithmetic unit 56 will indicate the amount that the scan-line departs in the opposite direction from the desired path. The output signal from arithmetic unit 56 is applied to a sample and hold circuit 62, which is reset by a start-of-line sync pulse at 60 it is passed through a one-scan-line-delay device 64. The output of the sample-and-hold circuit 62 on line 44 is a line position error signal or correction signal which applied to the frequency modulation input FM of the modulated oscillator 36 in FIG. 1. This line position signal acts to vary the frequency of the 40 MHz oscillation applied to the deflector/modulator 16 in such a direction and in such an amount as to cause the line optically scanned on the film to be positioned so that the successive scanlines are all equally spaced.

In the operation of the optical recorder shown in FIGS. 1 and 2, the multi-faceted mirror 20 is rotated by a motor 24 to cause the light beam from the laser 10 to sweep across successive lines 26 on the film 22 after first impinging on the array of photo-electric cells 50. As the beam passes from photo-cell A to photo-cell C or from photo-cell B to photo-cell D, an electrical start-of-scan-line synchronizing pulse is generated by the electrical circuit 51 to provide a start pulse at 60 which is applied to the synchronizing input of the source 32 of video information. In this way the source of video information, which is a line-by-line electrical signal representing an optical image, is synchronized with the optical scanning of the film. The video information signal then amplitude modulates the oscillator 30 and this in turn amplitude modulates the light beam passed by the light modulator 14.

As the modulated light beam scans the film the average brightness of the light beam is detected by the photo-cell 40, and the electrical signal produced thereby is fed over line 42 to the amplitude modulation input AM of the modulator oscillator 36 as an automatic brightness control. The amplitude of the oscillation applied over path 34 to the light deflector/modulator is automatically varied to maintain a desired average brightness of the light beam.

As the optical system produces the periodic scanlines over the film, the path of each light beam across the array 50 of photo-electric cells 50 produces a scan-line position signal on line 44 which is applied to the frequency modulation input FM of the modulated oscillator 36. The resulting frequency modulation of the electrical oscillation applied to the light deflector/modulator varies the amount of Bragg angle deflection of the light beam by the deflector/modulator 16. The variation in the amount of deflection of the beam is made to provide an automatically-corrected positioning of the line scan on the film despite non-uniform orientations of the facets of mirror 20. It is thus seen that the light deflector/modulator 16 performs two functions on the beam, one being the automatic control of brightness, and the other being the automatic control of the scan-line position to equalize the spacing of successive scan-lines.

The light deflector/modulator 16 and the modulator oscillator 36 also accomplishes a third function, namely, a spot elongation function by which the elongation of the optical beam traversing the film is varied in accordance with the speed of movement of the film in its longitudal direction. This elongation of the spot is made to fill the space between consecutive scan-lines when the signal is moving rapidly compared with the frequency with which the scan-line occur. Spot elongation is accomplished by employing a plurality of oscillators in the box 36. The oscillators are capable of simultaneously producing frequencies of 31, 34, 37, 40, 43, 46, and 49 MHz. In the normal condition when a circular spot is desired, only the 40 MHz oscillator is used. When a moderately elongate spot is desired, the 37 and 43 MHz oscillators are used. When a considerably elongated spot is desired, the 34, 40 and 46 MHz oscillators are used. Finally, when a maximum elongation of the spot is desired, the 31, 37, 43, and 49 MHz oscillators are used. The particular combination of oscillators which is used is determined by a film speed sensor 70 mechanically coupled to a pulley 72 over which the film 22 passes, and an oscillator selection circuit 74 which produces an output at 76 which is applied as a spot elongation control signal to the on-off modulation input OO of the modulated oscillator 36.

Figure 4:
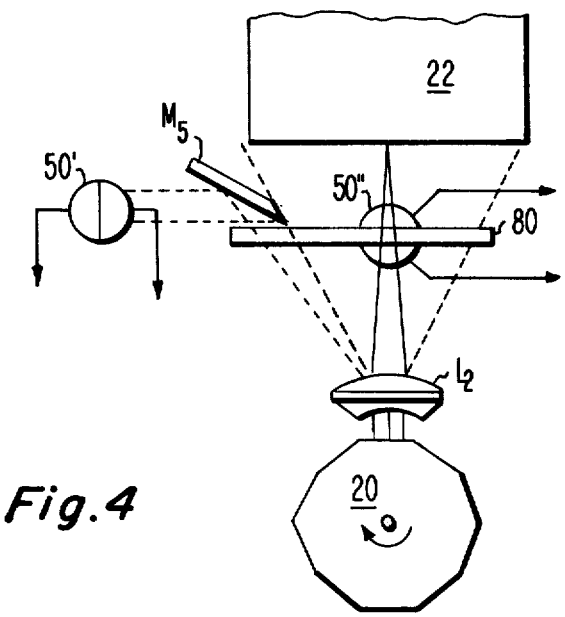
FIG. 4 is a diagram of a side view of an alternative system.
Figure 5:
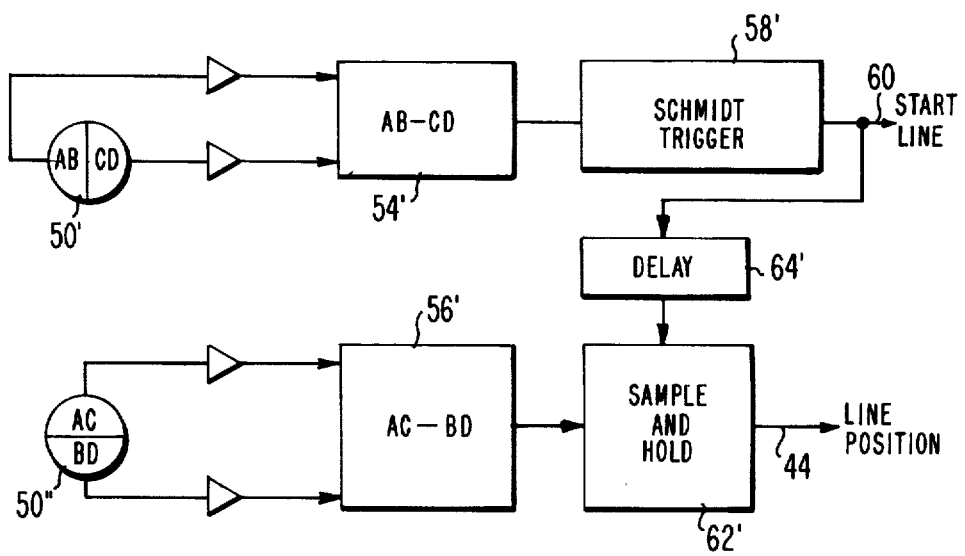
FIG. 5 is a diagram of a circuit useful with the alternative system of FIG. 5.

FIGS. 4 and 5 show an alternative arrangement of the photo-cells 50 in FIGS. 2 and 3 whereby a correction signal for line position is generated continuously during the scan-line, rather than just at the beginning of the scan-line. This is accomplished in FIGS. 4 and 5 by a partially reflecting mirror 80 positioned to reflect a small percentage of light in the scanning beam at right angles to an array 50" of two semicircular photo-electric cells AC and BD. The difference between the signals from the two photo-electric cells, and the polarity of the difference, is computed in arithmetic unit 56' and applied to sample and hold circuit 62', from which a "line position" correction signal is provided at 44 for application to the modulated oscillator 36 in FIG. 1.

In the arrangement of FIGS. 4 and 5, the "start line" signal is generated when the light beam is reflected by mirror M5 to and across an array 50' of photo-electric cells consisting of two semicircular cells AB and CD. The time when the signal from photo-electric cell AB ceases and the signal from photo-electric cell CD commences is sensed by arithmetic unit 54', and its output is used to trigger the Schmidt trigger 58' to produce a "start line" signal on output 60 for application to synchronizing input of the source 32 of video information in FIG. 1.

What is claimed is:

1. An optical scanner, comprising
    means in a light beam path including an acoustooptic light deflector/modulator and a deflector to cause a light beam to scan a line on a target,
    an electrical oscillator having an amplitude modulation input and a frequency modulation input and producing electrical oscillations coupled to said light deflector/modulator,
    a photo-electric cell positioned to receive a portion of the light in the beam, and having an electrical output coupled to the amplitude modulation input of said light deflector/modulator to effect an automatic brightness control of the beam,
    an array of photo-electric cells positioned to receive light from the scanned beam, and
    an electrical circuit responsive to the outputs of the array of photo-electric cells and having an output coupled to the frequency modulation input of the light deflector/modulator to effect an automatic line scan spacing control of the beam.

2. The combination of claim 1 wherein said oscillator consists of a plurality of oscillators of different frequencies, and includes means to simultaneously couple the plurality of oscillations to said light deflector/modulator to cause a beam spot which is elongated in the direction at right angles to the direction of scan.

3. The combination of claim 1, and in addition
    a light beam modulator in the path of said beam,
    an amplitude modulated oscillator having an output coupled to said light beam modulator, and having a modulation input,
    a source of a video signals coupled to the modulation input of said oscillator, and
    means coupling an output of said electrical circuit for said array of photo-electric cells to said source of a video signals to synchronize it with the scan-lines of the beam.

4. The combination of claim 3 wherein said array of photo-cells includes four photo-cells A, B, C and D arranged in four quadrants and each having an electrical output coupled to said electrical circuit, said photo-cells being positioned so that the termination of signal from A or B and the beginning of signal from C or D initiates a start line synchronizing pulse, and the sum of signals from A and C minus to the sum of the signals from B and D is a line position correction signal.

5. The combination of claim 4, whrein said electrical circuit includes a sample and hold circuit receptive to said line position correcting signal, and a one-scan-line delay responsive to said start line synchronizing pulse to reset said sample and hold circuit.

6. A flat field laser recorder, comprising
    an optical scanner in which a beam from a laser is directed through an acousto-optic light deflector/modulator and a scan lens, to a rotating multi-faceted mirror, and back through the scan lens to a linearly-moving light-sensitive film, whereby each facet of the mirror causes the light beam to scan and record a line on the film,
    an electrical oscillator having an amplitude modulation input and a frequency modulation input and producing electrical oscillations coupled to said light deflector/modulator,
    a photo-electric cell positioned to receive a portion of the light in the path between the laser and the film, and having an electrical output coupled to the amplitude modulation input of said light deflector/modulator to effect an automatic brightness control of the beam,
    an array of photo-electric cells positioned beside the film to receive light from the light beam at the beginning of each scan of the light beam across the film, and
    an electrical circuit responsive to the outputs of the array of photo-electric cells and having an output coupled to the frequency modulation input of the light deflector/modulator to effect an automatic line scan spacing control of the beam.

7. The combination of claim 6 wherein said oscillator consists of a plurality of oscillators of different frequencies, and includes means to simultaneously couple the plurality of oscillations to said light deflector/modulator to cause a beam spot on the film which is elongated in the direction of film movement.

* * * * *